(12) United States Patent
Wech et al.

(10) Patent No.: US 6,478,115 B1
(45) Date of Patent: Nov. 12, 2002

(54) OVERHEAD CONVEYOR LUBRICATION APPARATUS AND METHOD

(75) Inventors: Michael J. Wech, Two Rivers, WI (US); William P. Biaggio, Manitowoc, WI (US); Shaun M. Beauchamp, Manitowoc, WI (US)

(73) Assignee: Oil-Rite Corporation, Manitowoc, WI (US)

( * ) Notice: Subject to any disclaimer, the term of this patent is extended or adjusted under 35 U.S.C. 154(b) by 0 days.

(21) Appl. No.: 09/579,598

(22) Filed: May 26, 2000

(51) Int. Cl.[7] ............................................... F16N 13/22
(52) U.S. Cl. ....................................................... 184/15.2
(58) Field of Search ................................ 184/3.1, 15.1, 184/15.2, 15.3; 198/500

(56) References Cited

U.S. PATENT DOCUMENTS

| | | | | |
|---|---|---|---|---|
| 4,262,776 A | * | 4/1981 | Wilson et al. ............. | 184/15.1 |
| 4,566,560 A | * | 1/1986 | Elliott et al ............... | 184/15.1 |
| 4,648,486 A | * | 3/1987 | Kayser et al. ............. | 184/15.1 |
| 5,711,050 A | * | 1/1998 | Pimentel .................... | 184/15.1 |
| 5,934,411 A | * | 8/1999 | Murano et al. ............ | 184/15.1 |

* cited by examiner

Primary Examiner—Chong H. Kim
(74) Attorney, Agent, or Firm—Ryan Kromholz & Manion, S.C.

(57) ABSTRACT

A lubrication apparatus lubricates the chain and trolley components of an overhead conveyor supported by a rail. Immediate lubrication is provided to such components without the need of a timer, thereby preventing any lubricant from being applied to non-target surfaces. The apparatus is mounted to the rail using hooks so that the integrity of the rail is preserved and relocation is simple. The apparatus can withstand an impact from a passing mis-aligned trolley. The apparatus can be adapted to lubricate chain and trolley components on different rail profiles, including an I-beam.

27 Claims, 6 Drawing Sheets

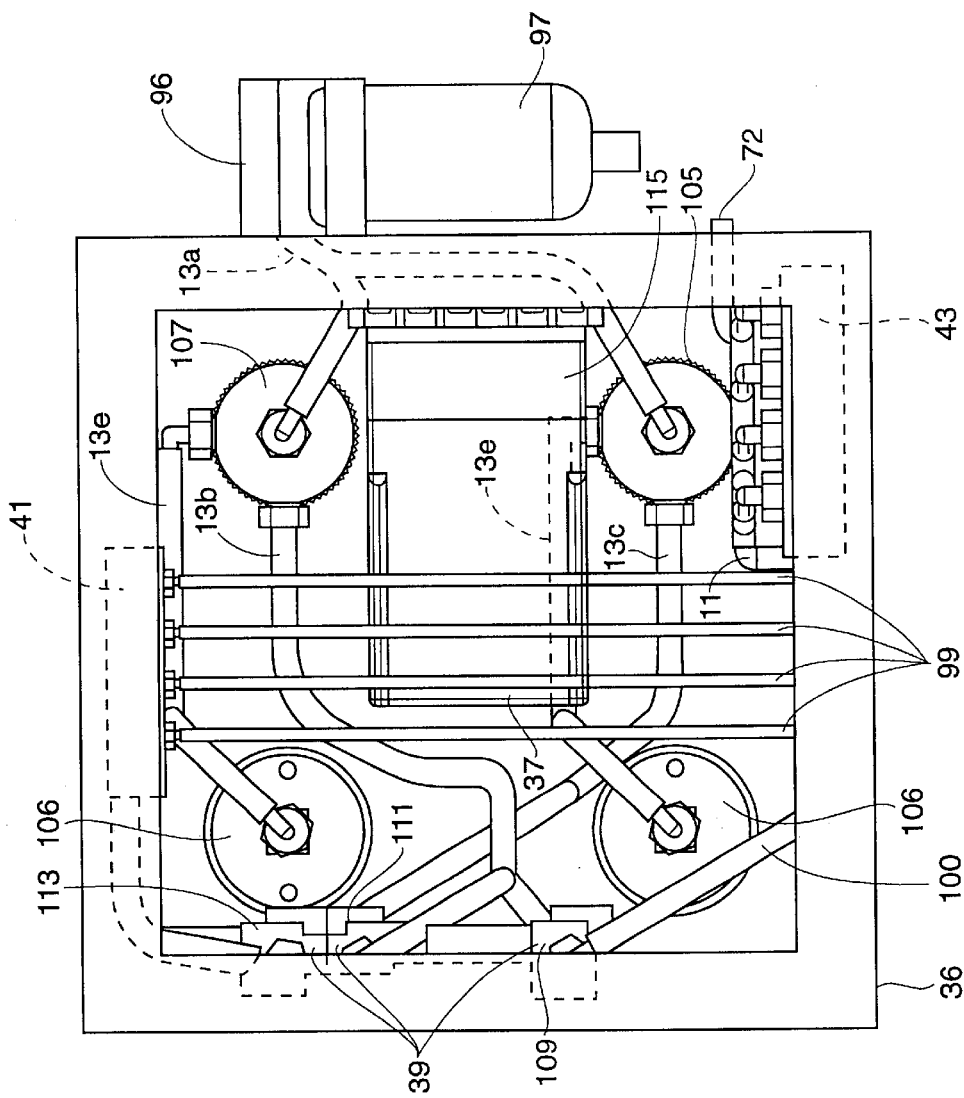
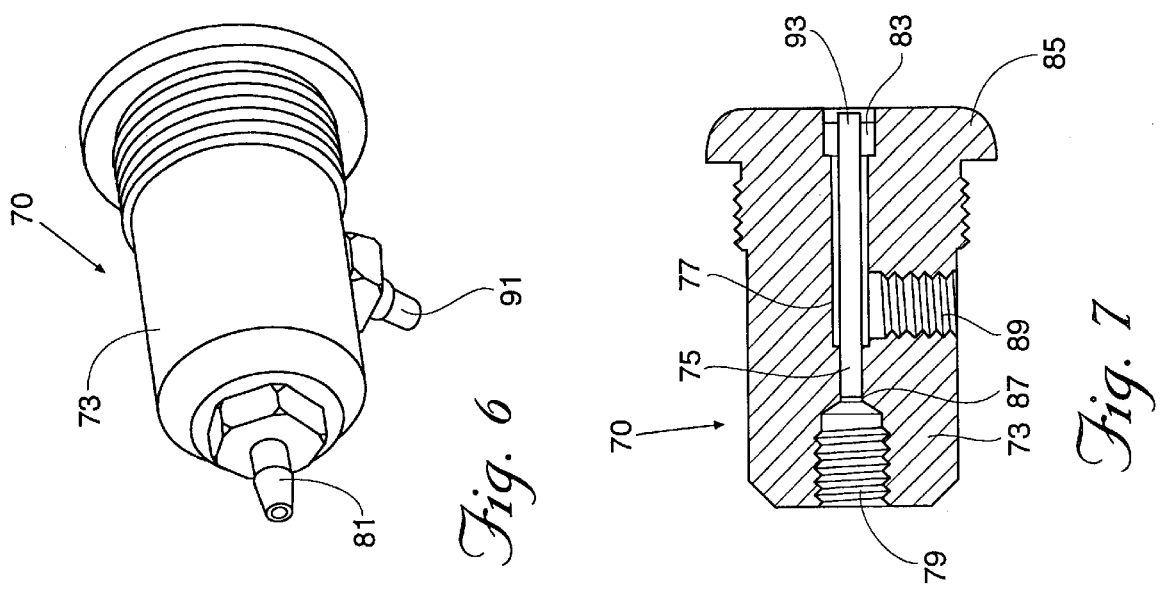

OVERHEAD CONVEYOR LUBRICATION APPARATUS AND METHOD

BACKGROUND OF THE INVENTION

The present invention relates generally to lubrication apparatus and method for an overhead conveyor system, and more particularly, to a lubrication apparatus method for an overhead chain and trolley conveyor system that selectively lubricates targets as they are presented.

Overhead "chain and trolley" conveyor systems are widely used in manufacturing and material handling operations. For instance, such systems can be designed to carry objects ranging from washing machines and car parts to poultry, and are used to move the objects through a plant in assembly-line like fashion. The conveyor system typically includes an elevated suspended guide rail, which is a beam having an I, T, L or other channel shape, and a series of interconnected wheeled trolley elements which hang from the beam, coupled to each other through a flexible chain-like linkage ("chains"). In the I-beam rail configuration, which is the most popular, the trolleys have a pair of bearing wheels which ride on the upper surface of the lower flange of the I-beam. The wheels extend from a yoke frame that girdles beneath and is centered on the web of the I-beam. The wheels are spaced from each other by a width that is just slightly greater than the thickness of the web of the I-beam, such that one wheel cannot slip off the lower flange, as the opposed wheel will encounter the web of the I-beam. The chain-like linkage is propelled, usually by a powered sprocket. In turn, the linkage moves the trolleys along the beam or guide rail.

In service, the trolley wheels and chains begin to wear over time. Points of wear include the bearing races within each wheel, and the joints between chain linkages. After a relatively short period of time, such as one year, the trolley and chains must be replaced to avoid the entire conveyor system binding and bringing the conveyor to a sudden halt. This frequent replacement can be an enormous expense for companies, especially if the trolley and linkages support very heavy objects, or if the conveyor system is lengthy. Lighter duty chain and trolley conveyors typically cost from $1 to $20 per foot, and may be used in plants having several miles of conveyors. Thus, the cost of replacing the chain and trolleys is very expensive, even without the costs associated with conveyor down-time and labor. It is very advantageous for companies to prolong the life of their overhead conveyors by regularly applying a lubricant thereto, as it is less costly than replacing the conveyor. This is especially true for the more expensive heavy-duty chains and trolleys.

Conventional lubrication systems for chain and trolleys have the disadvantage of applying a lubricant to an anticipated target such as a chain link or bearing race. For example, an upstream sensor will sense a particular target, and cause a lubricant to be released onto a downstream target. Because the targets are repetitive and equally spaced, it is anticipated that there will be a downstream target present to receive the lubricant when the upstream target is sensed. However, if there is a missing or damaged trolley, the lubricant will be released, but there will be no target present to receive it. Instead, the lubricant will either collect on the beam or drip down onto the conveyed object. In either case, lubricant will be wasted and applied to surfaces or objects other than a desired target. Furthermore, if the trolleys are sensed and only occur every few feet with several chain links in between, rather than a trolley for every chain link, then lubricant is not being applied to all of the chain links.

In many industries it is important to avoid having lubricant drip from the overhead conveyor onto the objects being conveyed. For example, in poultry processing plants, the conveyor system is used to carry a bird to and from the numerous work-stations as the bird is processed. Because the conveyed material is a food product, an essential performance criteria is that the conveyor and bird are kept clean of oil and other types of contamination.

Furthermore, mis-aligned trolleys cause not only misapplication of lubricant, but also hazards for the equipment that applies the lubricant, employees and/or equipment located below the apparatus. For example, if a trolley is missing a wheel and hanging out of alignment with the beam or rail, it can contact the lubrication apparatus and cause damage by bending the apparatus or knocking it free from the beam. The lubrication apparatuses need to withstand impact from mis-aligned trolleys.

In addition, lubrication apparatuses need to be easily replaceable and moveable for maintenance or other reasons. However, conventional lubrication apparatuses have the disadvantage of being attached to the beam in a manner that renders them impractical to relocate, and which lessens beam integrity. For example, holes are usually drilled into the beam so that the apparatus can be bolted thereon. Therefore, it is undesirable to relocate a conventional apparatus because new holes have to be placed in the beam each time such apparatus is moved.

SUMMARY OF THE INVENTION

Therefore, in view of the problems associated with the conventional type of overhead "chain and trolley" conveyor it is an object of the present invention to provide such an apparatus that will neither miss targets nor apply lubricant to objects other than the target. It is another object of the invention to provide a lubrication apparatus that can withstand impact from a mis-aligned trolley. It is yet another object of the invention to provide a lubrication apparatus that is can be readily relocated and has an attachment means that does not affect the structural integrity of the beam.

These and other objectives are met by the lubrication apparatus of the present invention. The lubrication apparatus is mounted to the beam using a mounting assembly. In one aspect of the invention, the mounting assembly uses hook members to attach the apparatus to the beam.

Depending on the configuration of the chain and trolley apparatus, there will be at least one bracket attached to the mounting assembly. The bracket or brackets hang adjacent the mounting assembly. Preferably, the brackets are pivotally attached to the apparatus so that they can readily move out of the way if a mis-aligned trolley hits the bracket. The brackets are further provided with flanges to direct any mis-aligned trolleys past the brackets without significant damage to the bracket.

At least one pump is attached to the apparatus, preferably to a bracket, the pump sending a lubricant to a nozzle that is directed to a target. Of course, one should realize that there may be more than one target, so a pump and nozzle is supplied for each separate target.

Lubricant is ejected from the nozzle when a photo-electric sensor attached to the apparatus senses the target. A control system is attached to the mounting assembly for controlling the air supply and pump operation.

In one aspect of the invention, an air supply is used to supply an air flow to each pump and to each nozzle to aid in ejecting the lubricant from the nozzle.

A method for lubricating a chain and trolley apparatus begins with positioning a lubricant dispersion device to project the lubricant at the target. Next, the target is sensed and lubricant is dispersed to the target. The dispersion of lubricant only occurs when a target is presented.

The present invention will be better understood from the following detailed description of the invention, read in connection with the drawings as hereinafter described.

DESCRIPTION OF THE DRAWINGS

FIG. 6 is an isometric view of the nozzle of the present invention;

FIG. 7 is a cross-sectional side view of the nozzle seen in FIG. 6, further showing the inner pathways for air and oil; and FIG. 8 is a schematic rear view of the control box.

DESCRIPTION OF THE PREFERRED EMBODIMENTS

The present invention is directed to a lubrication apparatus that applies lubricant to passing targets on an overhead "chain and trolley" conveyor without misapplication. Thus, the apparatus only delivers lubricant when a target is present to receive it. While the present invention will be described hereinbelow with regard to an "I-beam" embodiment, it should be understood that various design modifications could be made to this embodiment without departing from the scope of the present invention.

Figure 1:
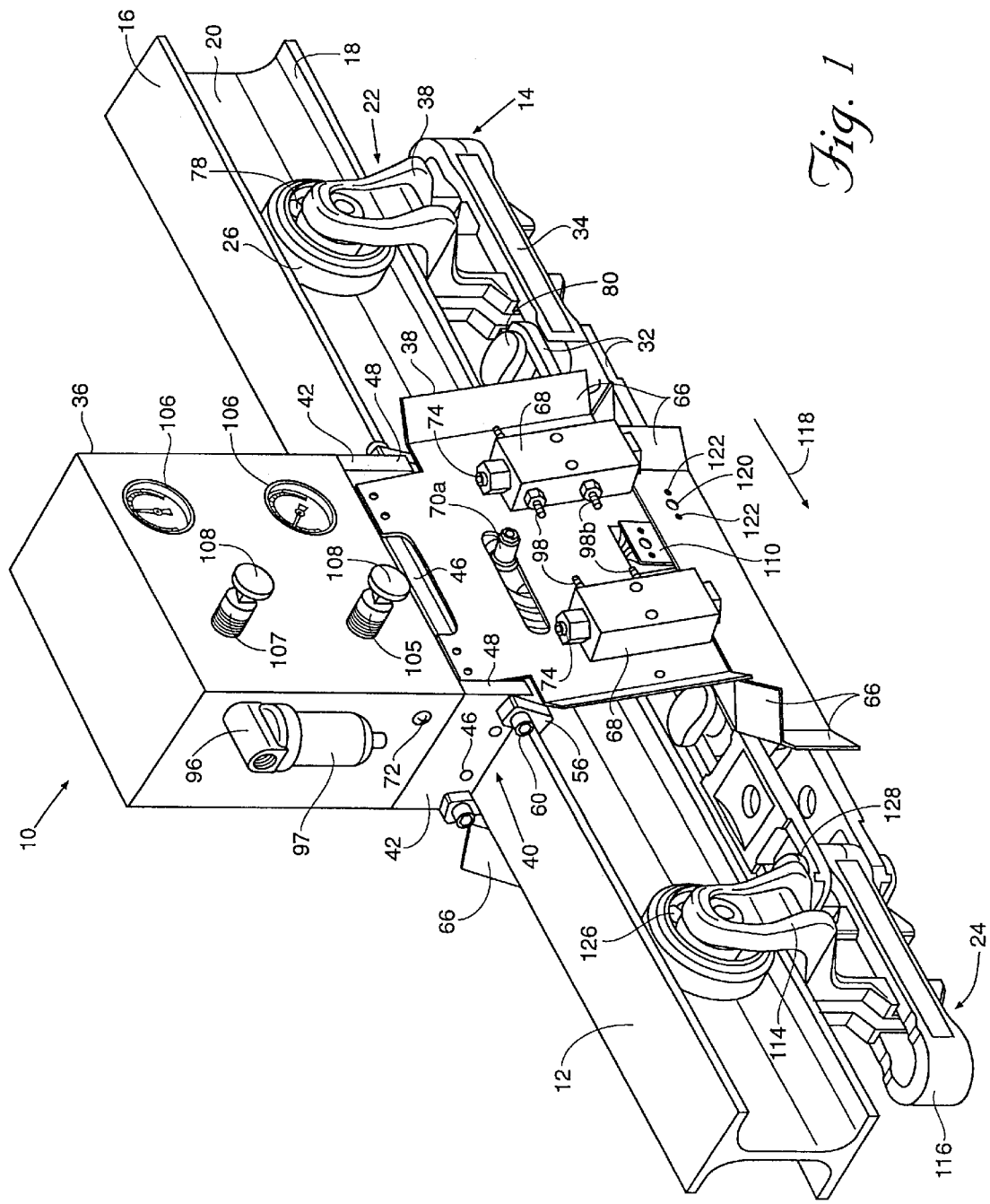
FIG. 1 is an isometric view of the lubrication apparatus of the present invention mounted on an overhead conveyor.
Figure 4:
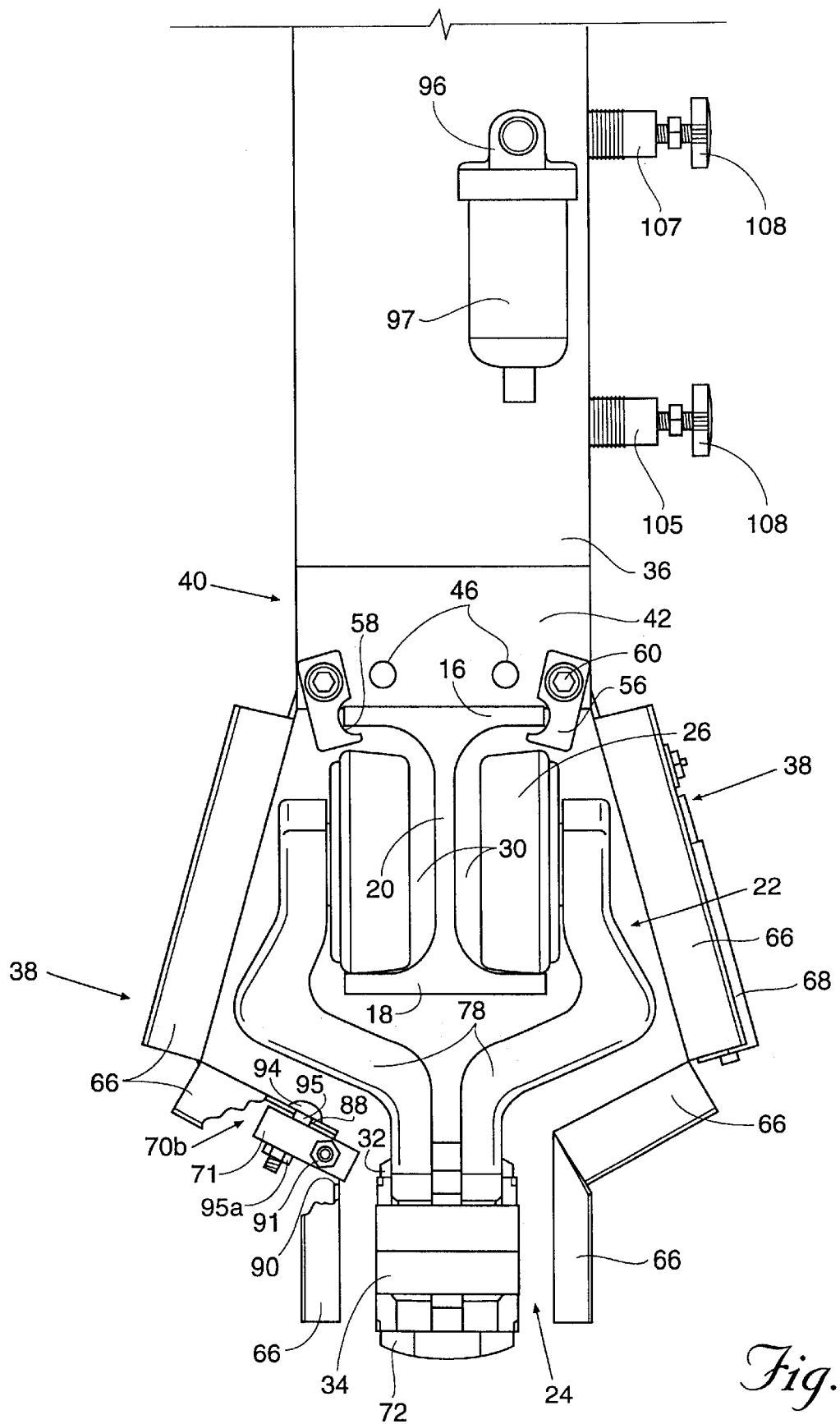
FIG. 4. is an end view of the lubrication apparatus of FIG. 1, having flange portions cut-away to show the lower nozzle.

The lubrication apparatus, generally referred to as 10, is shown in FIG. 1 in relationship to the beam or guide rail 12 of the overhead conveyor 14. The guide rail 12 is a suspended I-beam having an upper flange 16, a lower flange 18, and a web 20. The overhead conveyor 14 has multiple trolleys 22, which are linked in serial fashion to each other via a chain 24. Each trolley 22 is fitted with a pair of wheels 26 which are journaled to a yoke 28 that girdles beneath the guide rail 12. Some or all of the trolleys 22 convey one or more objects which hang from the yoke 28 by various means. As seen in FIG. 4, the wheels 26 are spaced so that they are separated by a gap 30 that is only slightly wider than the thickness of the web 20 of the guide rail 12. Referring again to FIG. 1, the chain 24 is constructed from a series of links 32 coupled by a center link 34.

Figure 2:
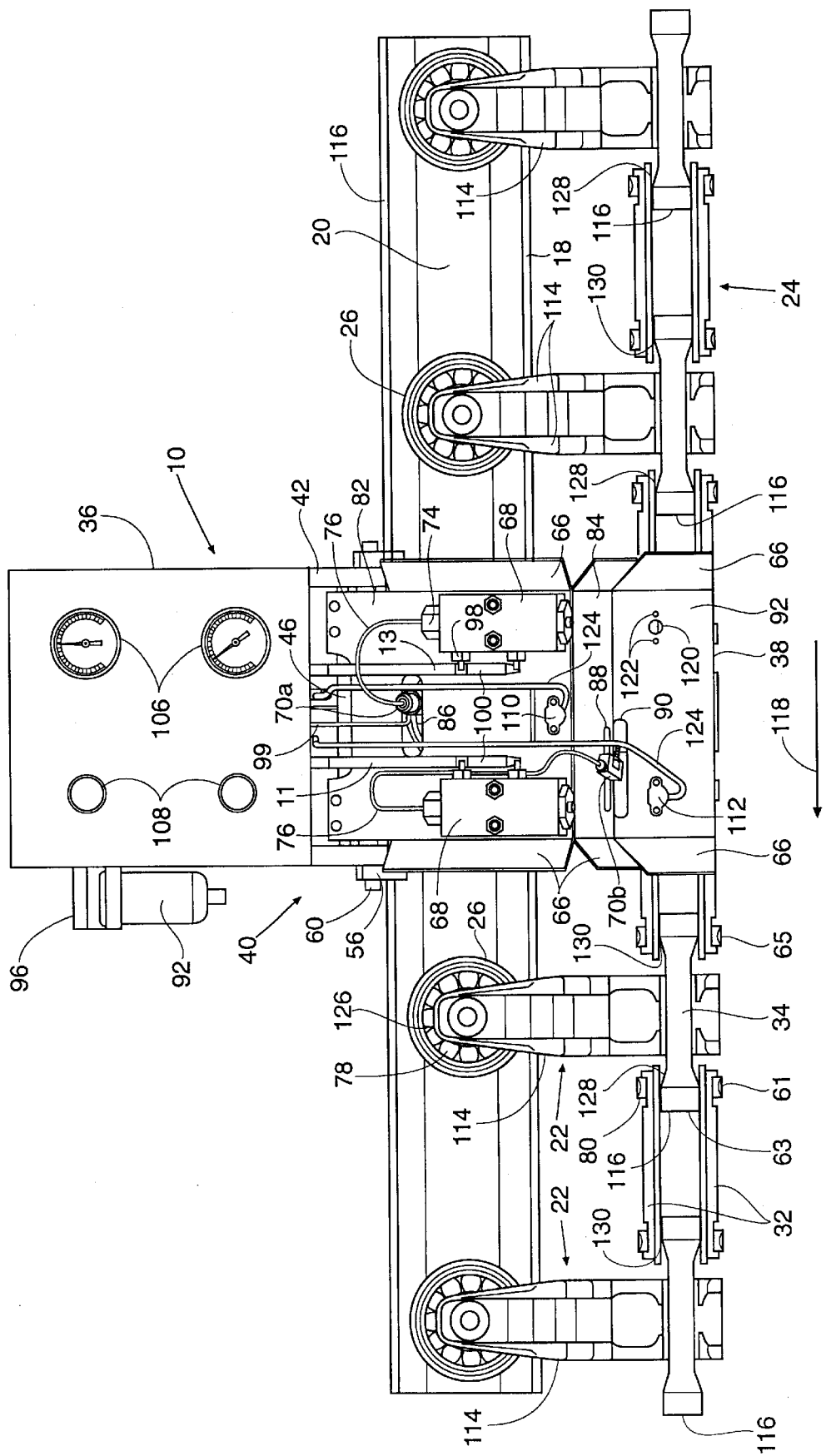
FIG. 2 is a front elevation view of the lubrication apparatus of FIG. 1.

As seen in FIGS. 2 and 4, the lubrication apparatus 10 has three main structural components, namely, a control box 36 and a pair of brackets 38, which are attached to a mounting assembly 40. Various other components are housed within the control box and attached to the brackets as described herein.

Apparatus 10 can be used to lubricate overhead "chain and trolley" conveyors of various sizes. Conveniently, apparatus 10 is modular and only the size of the brackets 38 and mounting assembly 40 changes accordingly. Therefore, the same control box 36, can be used for conveyors 14 of any size.

Control box 36 generally houses the control system for apparatus 10. Referring to FIG. 8, the control system is comprised of an electrical power supply unit 37, and several solenoids 39 used to distribute air to nozzle members and pumps as described herein. Also housed in control box 36 is an air manifold 41 and a lubricant manifold 43 for distributing the air and lubricant supplied from exterior sources, and two air-pressure regulators 105, 107, further described herein. Though the general arrangement of these components is not critical, it is preferable that the lubricant manifold 43 be oriented so that the lubricant supplied thereto is equally and simultaneously distributed to the lubricant lines 11. For example, this would be the case if the manifold was uniformly shaped (i.e. a parallelpiped), and the manifold floor and outlets were lying in horizontal and parallel planes. In the event of an accidental lubricant leak, lubricant manifold 43 is preferably located beneath the electrical components to prevent lubricant from wetting such components, as the lubricant can flow out of control box 36 through a hole (not shown) in the control box floor. This arrangement not only prevents one from having to clean up a mess inside control box 36, but prevents a possible short circuit as well.

Referring now to FIGS. 1 and 2, control box 36 is attached to mounting assembly 40 so that it is positioned on top of the beam or guide rail 12. Mounting assembly 40 is generally constructed from a pair of spaced end plates 42 connected by two spacers such as bars 44, and a pair of pivot rods 46. Both bars 44 and rods 46 are positioned so that their longitudinal axes are parallel. Preferably, end plates 42 are constructed from metal bar stock, and are held in a parallel spaced relation to provide support for both control box 36 and brackets 38. Furthermore, end plates 42 are equivalent in dimension so that when they are mounted to rail 12, control box 36 is stable with respect to rail 12, and the movement of brackets 38 is not hindered. As will be described herein, brackets 38 pivot about the longitudinal axes of rods 46. Therefore, the dimensions of end plates 42 are such that the plate edges 48 do not interfere with the movement of brackets 38.

Preferably, each rod 46 is connected to end plates 42 so that they are rigidly attached within apertures 50 formed in plates 42. Each rod 46 has an end block 52 at each end. End blocks 52 rotate about the rods 46, and provide surfaces 54 to which the brackets 38 may be attached. End blocks 52 are manufactured so that they can rotate completely around rods 46 to which they are attached. This will provide for a maximum range of movement for brackets 38.

Apparatus 10 is secured to rail 12 without having to drill holes therein. This attachment is achieved by a plurality of hooks 56. Hooks 56 are generally rectilinear members having an arcuate notch 58 on one face. Hooks 56 are pivotally attached to end plates 42 with fasteners 60 so that they can selectively engage upper flange 16. When apparatus 10 is positioned on rail 12 so that it is aligned thereto, hooks 56 are pivoted inwardly toward the rail web 20 until they engage upper flange 16, and fasteners 60 are then tightened. Preferably, fasteners 60 have hexagonal or other tool-accepting heads which require only a hex key and/or an open-ended wrench for fastening.

A pair of stop screws 62 are located on each side of the bars 44 between end plates 42. Stop screws 62 serve to provide an adjustment of the angle at which brackets 38 come to rest. Preferably, each pair of stop screws are equally adjusted so that the inside surface 64 of bracket 38 simultaneously comes to rest against the two stop screws 62 to which it is adjacent. Stop screws 62 are adjusted so brackets 38 are in an optimal position with respect to the passing trolleys 22, i.e. so that passing trolleys 22, if properly aligned, do not make contact with the brackets 38, but not to hinder movement of the brackets if a mis-aligned trolley is encountered.

Referring now to FIG. 4, brackets 38 are shown to have a profile that generally follows the contour of the trolley 22 and chain 24. Bracket 38 supports the components that sense and supply lubricant to various targets on the trolley 22 and chain 24. Thus, the closer these components are to the targets, the better the application of lubricant thereto. To easily achieve this bracket profile, it is preferable that brackets 38 are formed from sheet metal using a stamping and bending process. As will be evident herein, the sheet metal is desirable not only for ease of manufacture, but for its strength and light weight.

Because the trolleys are moving past brackets 38 at several feet per minute, a hazard is created for the brackets 38 of apparatus 10. Specifically, as indicated above, if a trolley is somehow mis-aligned and does not fit between the profiles of brackets 38, it will hit bracket(s) 38 with substantial force. Such force could be great enough to bend or tear off bracket(s) 38, or even cause the entire apparatus 10 to fall off the guide rail 12. Therefore, flanges 66 are provided on each side of brackets 38. Flanges 66 are angled away from the bracket's inner surface 64 to thereby guide the mis-aligned trolley between the brackets 38. Flanges are provided on each side of brackets 38 so that apparatus 10 can be mounted or the conveyor can move in either direction without consequence to the brackets.

Figure 3:
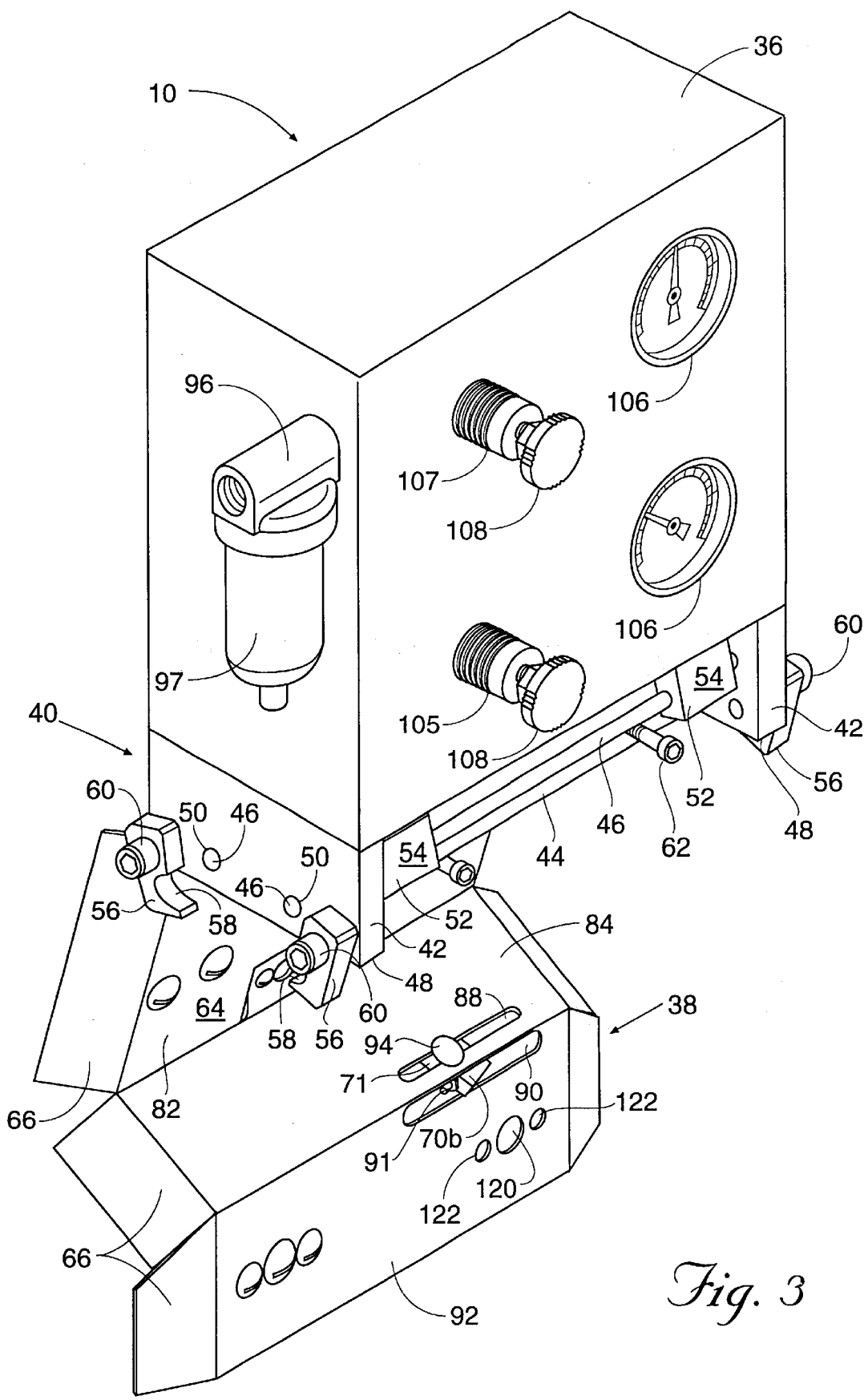
FIG. 3 is a partial isometric view of the lubrication apparatus of FIG. 1.

As indicated, brackets 38 are hinged about rods 46 so that if a mis-aligned trolley 22 hits a flange 66, the bracket 38 is able to swing out of the path of trolley 22. Thus, the flanges 66 serve to redirect forces applied to bracket 38 in the conveyor or "machine" direction, to that of a perpendicular direction. It is this force transmission that initially causes the brackets 38 to swing outwardly. Referring to FIG. 3, one should note that any fasteners or components that project from the bracket inner surface 64 should be rounded to provide a similar force transmission as the flanges 66, and to prevent the passing trolley from catching an edge and damaging bracket 38.

Referring now to FIGS. 1 and 2, various components are attached to the brackets 38 for sensing or delivering lubricant to targets on the overhead conveyor. These components are target specific, and generally include a pump 68 having a nozzle 70a or 70b (generally referred to as nozzles 70) and a photo-electric sensor 110 or 112 associated therewith. "Target specific" means that there is a separate pump 68 and nozzle 70 for each target. The independence of the pumps and nozzles ensures rapid, precise and consistent delivery of lubricant to each target. Furthermore, if a lubricant line gets plugged, the pump 68 will force the plug out of its corresponding single nozzle; if there were only one pump used for several nozzles, lubricant would flow from the unplugged outlets and the plug would not be forced out of the system. Moreover, as will become apparent, these target specific components allow for precise lubrication without the use of timers.

Each pump 68 is attached to the outer surface of a bracket 38. Preferably, pump 68 has the characteristic of being relatively compact and lightweight, and not prone to dripping, clogging or forming air pockets in the line between pump 68 and corresponding nozzle 70. One pump having such characteristics is the PURGEX® pump manufactured by the Oil-Rite Corporation of Manitowoc, Wis. This pump is described in U.S. Pat. No. 5,984,652, which was issued to Gruett et al. on Nov. 16, 1999. To avoid the formation of air bubbles in pump 68, it is preferable to position the pump outlet 74 in an upward position. Gravity will force the lubricant downward, and any bubbles upward so that they can flow out of the pump. Such air bubbles will be forced out through nozzle 70 without consequence. Another particular advantage of the PURGEX® pump is that is has an "evacuation seal." This evacuation seal is created by a slight vacuum created within the PURGEX® pump, such vacuum causing any excess lubricant left at the outlet of nozzle 70 to be drawn back into the nozzle. This is an advantage in that excess lubricant does not drip downward onto the floor or a conveyed object.

A nozzle 70 is connected to each pump outlet 74 by a lubricant line 76 so that the lubricant can be delivered to a corresponding target. The primary targets in the overhead conveyor of FIG. 2 are (1) the wheel bearing race 78 and (2) the pins 80 connecting the chain links 32 and center links 34. Therefore, in the preferred embodiment, on each bracket 38 there is a first nozzle 70a positioned in an upper panel 82 and aimed at the bearing race 78, and a second nozzle 70b is positioned in a middle panel 84 and aimed at the pins 80 through a window provided in the lower panel 92. In particular, on one bracket 38 there is a nozzle 70b aimed to the left so that it lubricates the first pin 61 behind the leading edge 63 of the center link 34 (see FIG. 2), and on another bracket 38 there is a nozzle aimed to the right so that it lubricates the second pin 65 connected to the same center link 34 (see FIGS. 2 and 3).

As seen in FIGS. 2 and 3, the nozzles 70a and 70b are preferably mounted in slots so that their position can be adjusted. Specifically, the nozzle 70a attached to bracket upper panel 82 can be horizontally positioned in a slot 86, and the nozzle 70b attached at bracket middle panel 84 can be horizontally positioned in a slot 88. A window slot 90 is provided in bracket lower panel 92. Window slot 90 is longer than slot 88 to accommodate nozzle 70b.

Referring now to FIGS. 6 and 7, the nozzle 70 is described. Though nozzle 70a is depicted in FIGS. 6 and 7, one skilled in the art will realize that even though the outer structure of the nozzles 70a and 70b are different, the inner structure is the same for both nozzles 70a and 70b. Therefore, the nozzle will be generically referred to in the following description as nozzle 70.

Nozzle 70 is constructed of a main body 73 generally having a lubricant passage 75 and an outer, concentric air passage 77. Initially, body 73 has a cylindrical bore 75 running the length of the body 73. At each end of the body 73, two counterbores are provided: a first counterbore 79 generally defining the lubricant inlet, and a second counterbore 77 generally defining the air outlet. At the opposite end of body 73, a third counterbore 83 is provided that is concentric with respect to second counterbore 77.

At the first counterbore 79, the lubricant inlet 79 is tapped to accommodate a fitting 81 that is connected to a lubricant line 76 (FIG. 2). Referring to FIG. 7, at the side of body 73, there is an air inlet 89 that communicates with counterbore 77. Air inlet 89 is also tapped to accommodate a threaded fitting 91 that is connected to air supply line 99 (see FIG. 2).

To keep the air and lubricant from mixing within nozzle body 73, a tube member 93 extends from the first counterbore 79 through the length of body 73. Tube member 93 is connected to body 73 with a press fit. It is important that tube member 93 be concentric with respect to bore 77. If the longitudinal axis of tube member 93 does not correspond with the longitudinal axis of counterbore 77, the air flowing through bore 77 will cause the lubricant to spray in a direction that is not parallel with the longitudinal axis. Preferably body 73 is constructed of brass, tube member 93 is constructed of stainless steel, and fittings 81, 91 are constructed of nylon.

As seen in FIGS. 2 through 4, the nozzle 70b body is a rectilinear block 71 rather than a cylinder shape so that it fits more easily against the bracket middle panel 84. Block 71 accommodates the interior structure of nozzle 70 as described in the preceding paragraphs, and is attached by a fastener such as carriage bolt 94, described in more detail below. Block 71 has a top, a bottom and four sides. The outlet of nozzle 70b is located at a side of block 71. A hole (not shown) extends from the top to the bottom of block 71 to accommodate the fastener. Therefore, the top of block 71 is mounted to bracket 38 at slot 88. This arrangement allows one to horizontally and vertically direct nozzle 70 through slot 90 for precise aim at the desired target.

Referring to FIGS. 3 and 4, the lower nozzle 70b is preferably attached to the middle panel 84 by a carriage bolt 94. A carriage bolt generally has a rounded bolt head, a four-sided or "square neck" 95 directly underneath the bolt head, and a threaded shank extending from the neck 95. Neck 95 is what slides in slot 88, and the tightening of a nut 95a onto the shank of bolt 94 prevents bolt 94 from spinning. This safely and conveniently allows one to adjust the lower nozzle 70b by applying a single wrench to the bolt shank and nut 95a located at the outer surface of bracket 38. Having to access anything at the inner surface of bracket 38 would require conveyor 14 to be stopped.

Figure 5:
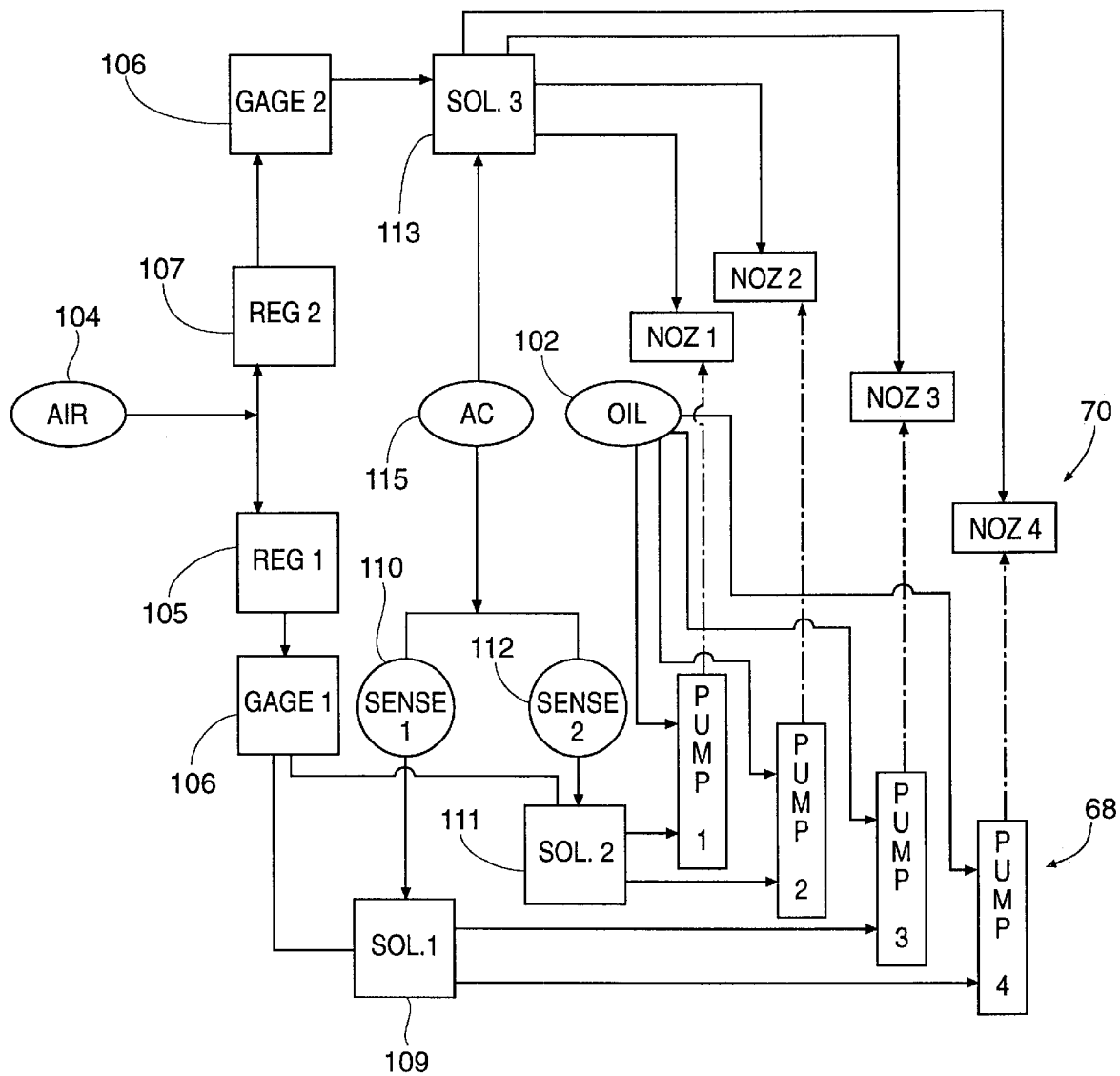
FIG. 5 is a schematic diagram showing the distribution of air, lubricant and power to various components of the present invention.

Referring to FIG. 1 lubricant is supplied to apparatus 10 from an outside source at a port 72. Lubricant distribution lines 11 run from the manifold 43, through an aperture (not shown) located in the floor of control box 36, out to an inlet 98 at each pump. As previously described, lubricant outlet lines 76 run between the pump outlets 74 and nozzles 70. FIG. 5. shows schematically how the lubricant supply 102 is distributed to four pumps 68 and their corresponding nozzles 70.

Pressurized air is also supplied to the apparatus 10 from an outside source 104. Referring to FIGS. 1 and 8, air is supplied to a port 96. An optional air filter 97 may be provided to filter the supplied air at the port 96. The air is supplied at a pressure of approximately 150 psi, and is distributed to a pair of pressure regulators 105, 107. These regulators 105, 107 are used to selectively decrease the pressure of air going to nozzles 70 and pumps 68. Referring also to FIG. 3, the pressure adjustment is made by turning the appropriate knurled knob 108 to adjust the regulator 105 or 107. Referring now to FIG. 8, a branched line 13a inside control box 36 connects port 96 to regulators 105 and 107. Branched line 13b connects regulator 107 to the solenoids 109 and 111. The air from solenoids 109, 111 goes to lines 100 (only one line 100 shown) which supplies air to the pumps at inlet 98b (shown in FIG. 1). Line 13c connects regulator 105 to solenoid 113. The air from solenoid 113 goes to a manifold 41, where it is distributed to air supply lines 99, which are connected to the nozzles 70. A pair of pressure gages 106 corresponding to each regulator are visible at the outside of control box 36 so that the operator can determine the air pressure resulting from the regulator 105, 107 adjustment. Lines 13e connect each regulator 105, 107 to gages 106.

As will be described more fully herein, when an electrical signal is received from the photo-electric sensors 110 and 112, the solenoids 109 and 111 permit air to flow to pumps 68 so that the lubricant can pass therethrough.

As seen in FIG. 5, the electrical power is supplied to the sensors 110, 112 and solenoids 109, 111 and 113 from the power supply 115. As soon as electrical power is supplied to solenoid 113, the air flows to the nozzles 70. There is a constant flow of air through the nozzles 70 at all times so that when the lubricant is released form the pump to nozzle 70, is transported more quickly to the target without a lag time.

The lines communicating between components on bracket 38 and control box 36 can enhance the assembly and operation of the apparatus 10. Preferably, the air and lubricant supply lines are flexible to allow bracket 38 to move freely. This also helps to ease assembly and any adjustment made to the position of nozzle 70. Furthermore, it is preferred that the air lines 100 are different in color and clarity than the lines carrying lubricant. For example, the air lines may be opaque and a blue color, whereas the lubricant lines may be clear and of no color. This allows an operator to easily distinguish the lines and see if there are any air bubbles or blockage in the lubricant lines. Finally, it is preferable that the lubricant outlet lines 76 are smaller in diameter than the distribution lines supplying lubricant to pump 68. This difference in diameter reduces the compression of gases within the lubricant, and ensures a more rapid delivery of lubricant to the nozzle 70.

Referring now to FIG. 2, independent photo-electric sensors 110 and 112 are used to sense whether a target is presented for lubrication. One skilled in the art will realize that other sensors can be used, such as a proximity sensor or the like. Each sensor 110 and 112 is comprised of two components, an infra-red light source and a receiver. Each sensor 110 component is located directly across from one another in bracket upper panel 82 so that the light beam produced by light source is received by the receiver. Likewise, each sensor 112 component is located directly across from one another in lower panel 92. Power is supplied to the light source from power supply 115 (see FIG. 5). The system operates as a closed system. When the beam is received by the receiver, the pumps 68 do not activate; when the beam is interrupted by a target, the pumps 68 send lubricant to the nozzles 70.

One skilled in the art will realize that placement of the various sensors and nozzles will vary depending on the trolley and chain configuration. Furthermore, the direction in which apparatus 10 is mounted onto rail 12 is affected by the direction in which the conveyor moves. The apparatus 10 is mounted to the rail so that when conveyor 14 is moving in machine direction 118, sensor 112 is positioned so that it is downstream of the nozzles 70b in either bracket 38. If the machine direction 118 were reversed, apparatus could be turned 180 degrees and remounted to rail 12.

As seen in FIG. 2, brackets 38 have two sets of apertures 120, 122 photoelectric sensor 112 is mounted in one set of apertures). With two sets of apertures 120, 122, bracket 38 can be mounted to either side of apparatus 10. This is an advantage in that assembly is less complicated and there is no need to order a specific replacement bracket 38 in case of bracket damage. Larger aperture 120 is a "window" for sensor 112, and smaller apertures 122 are for the fasteners used to attach sensor 112 to bracket 38. One skilled in the art will further realize that apertures 120, 122 could instead be elongated vertical slots to allow the vertical adjustment sensor 112. This is true for all other apertures that accommodate sensors 110 or 112. Such vertical adjustment is desirable when there is a sagging chain, as will be described herein.

In operation, apparatus 10 is secured to rail 12 using hooks 56. Apparatus 10 can be mounted to a horizontal, inclined or arcuate rail 12. As mentioned previously, there is no need to drill holes or otherwise affect the integrity of the beam or rail 12 during such attachment.

Apparatus 10 is mounted so that the regulator knobs 108 are easily accessible. This requires only the repositioning of the sensors 110 and 112, and nozzles 70a and 70b on each bracket 38, as described previously. After apparatus 10 is mounted onto rail 12, the aim of nozzles 70a and 70b is adjusted so that lubricant will hit specific targets immediately after their corresponding sensors 110, 112 are activated. Specifically, each trolley nozzle 70a is directed to lubricate the bearing race at point 126. Chain nozzle 70b in one bracket 38 will be directed to lubricate pin 80 at point 128 (see FIG. 2), and chain nozzle 70b located in the opposite bracket 38 will be directed to lubricate pin 80 at point 130 (see FIG. 3). Because the machine direction 118 is moving right to left, the lubricant is applied to point 128 after it has moved past its corresponding nozzle 70b, and the lubricant is applied to point 130 before it moves past its corresponding nozzle 70b.

Sensors 112 are aimed so that the light source emanating from the sensor remains interrupted during the entire time it takes center link 34 to pass sensor 112. This prevents premature firing of the pumps. In a case where the chain tends to sag, the sagging is taken into account when aiming the sensors 112 so that the infra-red light cannot transmit over the top of center link 34 as it passes.

It should be noted that because there is no timing involved between the sensing and lubrication of the targets, the chain 24 can move at varying speeds and still be properly lubricated at the desired targets. Only an adjustment of the nozzles 70 or sensors 110, 112 is required.

Once the sensors 110, 112 and nozzles 70a and 70b have been properly positioned, the air and lubricant supply is connected. The air pressure is adjusted at regulators 105 and 107 by adjusting knobs 108. In the embodiment shown in the drawings, regulator 105 corresponds to the nozzles 70, and regulator 107 corresponds to the pumps 68. Preferably, air is supplied to the pumps 68 at a pressure of 80 to 100 psi, whereas air is supplied to the nozzles 70 at a much lower pressure, approximately 20 psi. The pumps 68 require a higher pressure to aid in the quick disbursement of lubricant. The nozzles 70 require only enough air pressure to aid in the quick delivery of the lubricant to the target without atomizing the lubricant. Furthermore, the air flow from the nozzle 70 helps to prevent dripping.

Apparatus 10 is now ready for operation. As each trolley 22 and chain 24 move between the brackets 38 of apparatus 10, sensors 110 and 112 will be triggered so that an electrical signal is sent to solenoid 109 or 111. Solenoid 109 or 111 will send an air pulse to its corresponding pumps 68, which in turn causes lubricant to travel from pumps 68 to nozzles 70. The air supplied to nozzle 70 and the air pressure supplied to pump 68 is high enough to project the lubricant from the nozzle 70 to a target.

While the overhead conveyor lubrication apparatus of the present invention has been described and illustrated hereinabove with regard to specific embodiments, it should be understood that various design modifications could be made to these embodiments without departing from the scope of the present invention. For example, the invention could be used with rail shapes other than an I-beam. Furthermore, the inner bearing race of the trolley could be lubricated by aiming a nozzle at the inner race thorough a hole in the top flange of the I-beam. Therefore, the present invention is not to be limited to these specific embodiments, except insofar as such limitations are included in the following claims.

What is claimed is:

1. A lubrication apparatus in a trolley and chain assembly for applying lubricant to a target, the lubrication apparatus comprising:
    a mounting assembly adapted for mounting to a beam,
    at least one bracket having an outer surface, an inner surface and a guide, said bracket attached to the mounting assembly, and positioned to hang adjacent to the at least one target located on the trolley and chain assembly;
    at least one nozzle corresponding to and directed at the at least one target;
    at least one pump attached to the apparatus for pumping the lubricant to the at least one nozzle;
    at least one sensor attached to the apparatus for sensing the at least one target to be lubricated; and
    a control system attached to the mounting assembly for controlling an air supply and the at least one pump.

2. The lubrication apparatus of claim 1 wherein the mounting assembly comprises a pair of spaced end plates connected to each other with at least one spacer disposed between the plates.

3. The lubrication apparatus of claim 2 wherein the at least one spacer comprises a pair of spaced rods, the rod axes substantially parallel to one another.

4. The lubrication apparatus of claim 3 wherein the at least one spacer further comprises at least one bar extending between the end plates, the at least one bar having opposite surfaces facing the at least one bracket, and an at least one stop screw attached to each surface to contact a corresponding interior surface of the at least one bracket.

5. The lubrication apparatus of claim 2 further including a plurality of hook members attached to each end plate, the hook members capable of securing the apparatus to the beam.

6. The lubrication apparatus of claim 1 wherein the at least one bracket is pivotally attached to the mounting assembly so that the at least one bracket can pivot outwardly.

7. The lubrication apparatus of claim 1 wherein the guide comprises at least one flange that is directed away from the inner surface of the at least one bracket.

8. The lubrication apparatus of claim 1 wherein the at least one bracket has a profile shape such that the at least one nozzle is located in close proximity of the at least one target.

9. The lubrication apparatus of claim 1 wherein the at least one pump is attached to the bracket outer surface in a manner that discourages air bubbles from forming in a line extending from the at least one pump to the corresponding at least one nozzle.

10. The lubrication apparatus of claim 1 wherein the at least one sensor is mounted relative to the at least one nozzle so that lubricant can be dispensed to the at least one target before the at least one target is conveyed past the at least one nozzle.

11. The lubrication apparatus of claim 1 wherein the at least one sensor is comprised of a photo-electric sensor.

12. The lubrication apparatus of claim 1 wherein the apparatus is adaptable for mounting to an arcuate portion of the beam.

13. The lubrication apparatus of claim 1 wherein the at least one pump has an evacuation seal to prevent dripping lubricant.

14. The lubrication apparatus of claim 1 further including an air supply for supplying an air flow to the at least one nozzle to aid in ejecting the lubricant therefrom.

15. The lubrication apparatus of claim 1 further including an air supply for supplying an air flow to the at least one pump.

16. The lubrication apparatus of claim 14 wherein the at least one pump has an inlet line and an outlet line each with a diameter, and wherein the inlet line diameter is larger than the outlet line diameter to discourage the formation of air bubbles in the outlet line.

17. The lubrication apparatus of claim 1 further including a lubricant manifold for holding and distributing lubricant to at least one line which is connected to the at least one pump.

18. The lubrication apparatus of claim 1 wherein the at least one sensor and at least one nozzle is mounted in slots so that their positions are adjustable.

19. The lubrication of claim 1 wherein the control system is capable of being removed and rotated 180 degrees.

20. The lubrication apparatus of claim 1 further comprising the trolley and chain assembly that runs along the beam wherein there is at least one sensor positioned to sense the trolley and a second at least one sensor positioned to sense the chain, and whereby if a trolley is missing, the chain is still lubricated.

21. The lubrication apparatus of claim 1 wherein the at least one pump is mounted to the at least one bracket in a manner to discourage air bubbles from being retained in the at least one pump.

22. The lubrication apparatus of claim 1 wherein air is constantly supplied to the at least one nozzle when the apparatus is in operation.

23. The lubrication apparatus of claim 22 wherein air is supplied to the at least one pump, and wherein separate regulators are used to regulate the air pressure to the at least one pump and to the at least one nozzle.

24. A lubrication apparatus in a trolley and chain assembly for applying lubricant to a target, the lubrication apparatus comprising:
   a mounting assembly adapted for mounting to a beam;
   a pair of brackets attached to the mounting assembly at opposite sides thereof, and positioned to hang adjacent to the at least one target located on the trolley and chain assembly;
   the pair of brackets each having an outer surface, an inner surface and guides;
   at least one nozzle that is corresponding to and directed at the at least one target;
   at least one pump attached to each bracket for pumping a lubricant to the at least one nozzle;
   at least one sensor attached to the apparatus for sensing the target to be lubricated;
   an air supply for supplying an air flow to each nozzle to aid in ejecting the lubricant from the nozzle and for supplying an air flow to at least one pump; and
   a control system for controlling the air supply and at least one pump operation.

25. The lubrication apparatus of claim 24 wherein the guides comprise flanges that are directed away from the inner surface of the pair of brackets.

26. The lubrication apparatus of claim 24 wherein the pair of brackets have a profile shape such that the nozzles are located in close proximity of the at least one target.

27. A lubrication apparatus for lubricating a trolley and chain assembly that runs along a beam to transport objects, the trolley and chain mechanism having two opposite sides, and the lubrication apparatus comprising:
   a mounting assembly adapted for mounting to the beam, the mounting assembly comprising a pair of end plates separated by two bars and a pair of rods extending between the plates, and further including four hook members attached to the end plates, the hook members having notched surfaces;
   two brackets with flanges along each of their sides, the brackets pivotally attached to the rods, and positioned to hang adjacent to a pair of targets located on each opposite side of the trolley and chain assembly;
   two pairs of nozzles, each pair attached to one of the brackets, each separate nozzle corresponding to and directed at one target in a pair of targets;
   a pair of pumps corresponding to each pair of nozzles, each pair of pumps attached to one of the brackets;
   four sensors attached to the apparatus for sensing the targets to be lubricated;
   a control system that is attached to the mounting assembly for controlling an air supply and the pumps.

* * * * *